Patented June 13, 1933

1,913,794

UNITED STATES PATENT OFFICE

KARL DAIMLER AND KARL PLATZ, OF FRANKFORT-ON-THE-MAIN-HOCHST, GERMANY, ASSIGNORS TO I. G. FARBENINDUSTRIE AKTIENGESELLSCHAFT, OF FRANKFORT-ON-THE-MAIN, GERMANY

PROCESS OF PREPARING ETHIONIC ACID OR CARBYL SULPHATE

No Drawing. Application filed May 11, 1931, Serial No. 536,684, and in Germany May 16, 1930.

The present invention relates to a new step in the process of manufacturing carbyl sulphate or ethionic acid and homologous products thereof.

We have found that ethionic acid or carbyl sulphate or homologous products thereof can be obtained in an easy manner and with a good yield by causing a sulphonating agent, such as sulphur trioxide or chlorosulphonic acid, separately or mixed with one another, or fuming sulphuric acid, to react upon an olefin in the presence of liquid sulphur dioxide. In order to obtain ethionic acid or carbyl sulphate, there have to be used at least 2 mols of the sulphonating agent for 1 mol of olefin. Mixtures of olefins, for instance cracking gases, are likewise suitable for the purpose in question. An alcohol or a homologue or a derivative thereof may also be used instead of the olefins. If an alcohol is used, one molecule of water is first split off from the alcohol and the sulphonating agent is then added to the unsaturated compound thus produced.

The products obtained according to this process, for instance carbyl sulphate or ethionic acid, may easily be converted into their saponification products by saponifying them. This invention, therefore, provides a particularly cheap method of obtaining isethionic acid or the homologues thereof.

By the use of liquid sulphur dioxide it is not only possible to apply a very low reaction temperature and thus to insure a very mild course of the reaction, but any spontaneous heating to a temperature above 0° is prevented because liquid sulphur dioxide immediately evaporates above this temperature and, therefore, exerts a strong cooling action. After the reaction is complete the sulphur dioxide can be eliminated more easily than any other solvent by moderately heating the reaction mixture. The sulphuric acid which is produced in the course of the reaction can be removed by filtration.

If it is intended to use ethionic acid for the reaction with a body which is soluble in liquid sulphur dioxide, the removal of sulphur dioxide can be dispensed with. The preparation of ethionic acid and the condensation with another body can in this case be combined into one operation by the use of sulphur dioxide as a solvent.

The following examples serve to illustrate our invention, but they are not intended to limit it thereto, the parts being by weight:

1. A solution of 2400 parts of sulphur trioxide in 3000 parts of liquid sulphur dioxide are caused to run in the course of 7 hours into 480 parts of ethyl alcohol, while stirring and cooling. Sulphur dioxide is then eliminated by distillation. The crystalline magma of carbyl sulphate obtained is filtered by suction.

2. 480 parts of ethyl alcohol are dissolved in 500 parts of liquid sulphur dioxide. Into this solution is run in the course of 6 hours a solution of 1600 parts of sulphur trioxide in 1600 parts of liquid sulphur dioxide. The whole is stirred for 10 hours at the existing temperature and then heated to 10° C.–15° C. The liquid sulphur dioxide is partly distilled during this operation. The product obtained consists of crude ethionic acid which in this condition can be used for reactions without any further treatment.

3. 240 parts of sulphur trioxide are dissolved in 400 parts of liquid sulphur dioxide. Into this solution 28 parts of ethylene are introduced in a slow current. The sulphur dioxide is then eliminated by distillation and the crystalline magma cooled to 0° is filtered by suction. Carbylsulphate is obtained in crystalline form in a yield of 90 per cent. of the theory.

4. Into a solution of 160 parts of sulphur trioxide and 116 parts of chlorosulphonic acid in 600 parts of liquid sulphur dioxide a solution of 74 parts of butyl alcohol in 150 parts of liquid sulphur dioxide is caused to run. The whole is stirred for several hours and the sulphur dioxide is then eliminated by distillation. The residue is separated from formed sulphuric acid by filtration. There is thus obtained the homologue of the carbyl sulphate derived from butyl alcohol in a yield of 90 per cent.; the product has the probable formula:

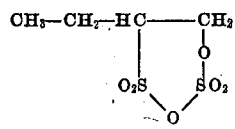

As according to the present reaction the corresponding alcohols may be used instead of the olefins, the term "olefin" in the following claims is to be understood to comprise also the alcohol corresponding to the olefin as equivalent.

We claim:

1. The process which consists in causing a sulphonating agent selected from the group consisting of sulphur trioxide, chlorosulphonic acid and fuming sulphuric acid to react with an olefin in the presence of liquid sulphur dioxide.

2. The process which consists in causing at least 2 mols of a sulphonating agent selected from the group consisting of sulphur trioxide, chlorosulphonic acid and fuming sulphuric acid to react with one mol of an olefin in the presence of liquid sulphur dioxide.

3. The process which consists in causing a mixture of chlorosulphonic acid and sulphur trioxide to react with an olefin in the presence of liquid sulphur dioxide.

4. The process which consists in causing a mixture of chlorosulphonic acid and sulphur trioxide to react with ethylene in the presence of liquid sulphur dioxide.

5. The process which consists in causing sulphur trioxide to react with ethylene in the presence of liquid sulphur dioxide.

6. The process which consists in causing at least 2 mols of sulphur trioxide to react with one mol of ethylene in the presence of liquid sulphur dioxide.

In testimony whereof, we affix our signatures.

KARL DAIMLER.
KARL PLATZ.